(12) United States Patent
Ochi

(10) Patent No.: US 6,771,119 B2
(45) Date of Patent: Aug. 3, 2004

(54) ACTIVE POWER FILTER FOR ISOLATING ELECTRICALLY NOISY LOAD FROM LOW NOISE POWER SUPPLY

(75) Inventor: Sam Ochi, Saratoga, CA (US)

(73) Assignee: IXYS Corporation, Santa Clara, CA (US)

( * ) Notice: Subject to any disclaimer, the term of this patent is extended or adjusted under 35 U.S.C. 154(b) by 0 days.

(21) Appl. No.: 09/915,202

(22) Filed: Jul. 23, 2001

(65) Prior Publication Data

US 2002/0047743 A1 Apr. 25, 2002

Related U.S. Application Data

(60) Provisional application No. 60/220,050, filed on Jul. 21, 2000.

(51) Int. Cl.[7] .............................. H03B 1/00; H03K 5/00; H04B 1/10
(52) U.S. Cl. ....................................... 327/552; 327/538
(58) Field of Search ................................ 327/551, 552, 327/538

(56) References Cited

U.S. PATENT DOCUMENTS 4,078,205 A * 3/1978 Van Schoiack ............. 330/107
4,158,824 A * 6/1979 Wouters et al. ............... 327/44

* cited by examiner

*Primary Examiner*—Terry D. Cunningham
*Assistant Examiner*—Quan Tra

(74) *Attorney, Agent, or Firm*—Townsend and Townsend and Crew LLP

(57) ABSTRACT

An active power filter includes a feedback resistor and a shunt capacitor, an operational amplifier equivalent subcircuit, and a voltage drop source. The shunt capacitor connects the positive terminals of the low noise power supply and the noisy load to the positive terminal of the operational amplifier equivalent subcircuit. The feedback resistor connects the negative terminal of the noisy load and the output of the operational amplifier equivalent subcircuit to the negative terminal of the shunt capacitor. The voltage drop source connects the negative terminal of the low noise power supply to the negative terminal of the operational amplifier equivalent subcircuit. The operational equivalent subcircuit includes an operational amplifier, three resistors, three capacitors, and a transistor. The first resistor connects the positive terminal of the voltage drop source to the negative input terminal of the operational amplifier. The second resistor connects the output of the operational amplifier to the gate of the transistor. The drain of the transistor is coupled to the negative terminal of the noisy load. The source of the transistor is coupled to the negative terminal of the voltage drop source and to the negative terminal of the low noise direct current power supply. The first capacitor connects the output of the operational amplifier to the negative input terminal of the operational amplifier. The second capacitor connects the output of the operational amplifier to the gate of the transistor. The third capacitor and a third resistor are connected in series between the gate of the transistor and the negative terminal of the low noise direct current power supply.

10 Claims, 4 Drawing Sheets

ACTIVE POWER FILTER FOR ISOLATING ELECTRICALLY NOISY LOAD FROM LOW NOISE POWER SUPPLY

CROSS-REFERENCE TO RELATED APPLICATIONS

This application claims priority from U.S. Provisional Application No. 60/220,050, entitled "Active Power Filter Invention", filed Jul. 21, 2000, which is herein incorporated by reference in its entirety for all purposes.

BACKGROUND OF THE INVENTION

1. Field of the Invention

The present invention relates to the field of supplying direct current (DC) power; and specifically, to filtering noise between the power supply and the load driven by the power supply.

2. Discussion of the Related Art

FIG. 1 illustrates a conventional filter for isolating an electrically noisy load from a low noise main power supply source. The conventional circuit illustrated in FIG. 1 is used primarily to filter an electrically noisy load 101 such as a switching DC to DC converter, brushless DC motor, switching logic circuit, or another noisy direct current powered circuit from a low noise main power source, $V_{IN}$. Inductor L1 acts as a passive low pass filter for isolating a low noise main power source, $V_{IN}$, from noise generated by the noisy load.

The inductance value of inductor L1 is chosen to optimize the noise filtering requirements. In designing the TLE conventional circuit such as illustrated in FIG. 1, care must be exercised in the choice and physical placement of inductor L1 as it may emit magnetic noise interference, and it may be physically large. Magnetic noise interference may undesirably affect the performance of the load device, the power supply, and other unrelated electronic/magnetic devices in the physically nearby area of the system illustrated in FIG. 1.

SUMMARY OF THE INVENTION

An object of the present invention is to create an active power filter which behaves like a filter circuit having a large inductor, but without producing magnetic interference or physically large components as would be produced by a conventional large inductor. The power filter according to the present invention is suitable for use with switching DC to DC converters, brushless DC fans, switching logic circuits, and other noisy loads.

According to the present invention, an active power filter includes a feedback resistor and a shunt capacitor, an operational amplifier equivalent subcircuit, and a voltage drop source. The shunt capacitor connects the positive terminals of the low noise power supply and the noisy load to the positive terminal of the operational amplifier equivalent subcircuit. The feed back resistor connects the negative terminal of the noisy load and the output of the operational amplifier equivalent subcircuit to the negative terminal of the shunt capacitor. The voltage drop source connects the negative terminal of the low noise power supply to the negative terminal of the operational amplifier equivalent subcircuit.

According to the present invention, the impedance of the active power filter at a minimum noise frequency is carefully designed so as to be large in comparison to an impedance of the noisy load, for example, the impedance of the active power filter is 1000 times the impedance of the noisy load at the minimum noise frequency. The active power filter according to the present invention is equally capable of protecting a low noise load device to a noisy direct current power supply.

According to another aspect of the present invention, the operational equivalent subcircuit includes an operational amplifier, first and second resistors, and a transistor. The first resistor connects the positive terminal of the voltage drop source to the negative input terminal of the operational amplifier. The second resistor connects the output of the operational amplifier to the gate of the transistor. The drain of the transistor is coupled to the negative terminal of the noisy load. The source of the transistor is coupled to the negative terminal of the voltage drop source and to the negative terminal of the low noise direct current power supply. The positive input terminal of the operational amplifier forms the positive input terminal of the operational amplifier equivalent subcircuit.

In an exemplary embodiment of the active power filter according to the present invention, the operational amplifier equivalent subcircuit further includes, first and second capacitors. The first capacitor connects the output of the operational amplifier to the negative input terminal of the operational amplifier. The second capacitor connects the output of the operational amplifier to the gate of the transistor. In addition, the operational amplifier equivalent subcircuit may contain a third capacitor and a third resistor which are connected in series between the gate of the transistor and the negative terminal of the low noise direct current power supply. In an exemplary embodiment, the transistor comprises an N-channel enhancement mode MOS field effect transistor.

These and other features, aspects, and advantages of the present invention are more fully described in the Detailed Description of the Invention with reference to the Figures.

The Figures are more thoroughly explained in the Detailed Description of the Invention.

DETAILED DESCRIPTION OF THE INVENTION

Figure 2:
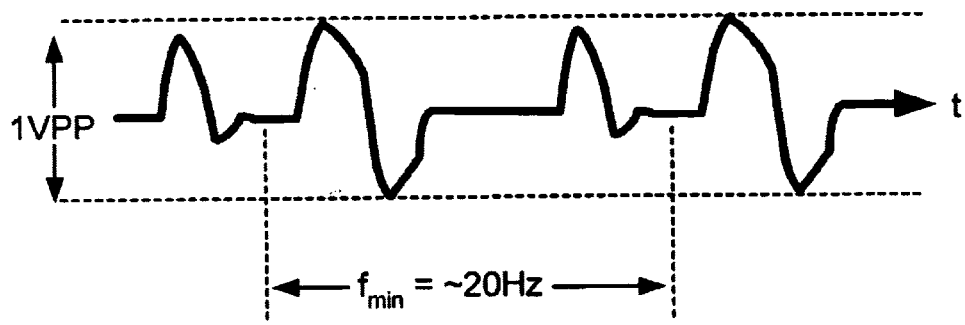
FIG. 2 illustrates an exemplary load noise generated at the power terminals of the noisy load by the noisy load.

FIG. 2 illustrates an exemplary load noise, $\Delta V_{OUT}$, that the noisy load 101 generates at its power terminals. As an example, the noisy load 101 may be a 10 Amp DC load with 1 Amp AC (alternating current), $\Delta I_{OUT}$, of noise with approximately 1 V PP (peak-to-peak), and with spectral frequency components as low as 20 Hz, such as illustrated in FIG. 2. The dynamic load impedance can be expressed as the following Equation 1.

$$Z_{LOAD} = \Delta V_{OUT} / \Delta I_{OUT} \qquad \text{(Equation 1)}$$

Figure 1:
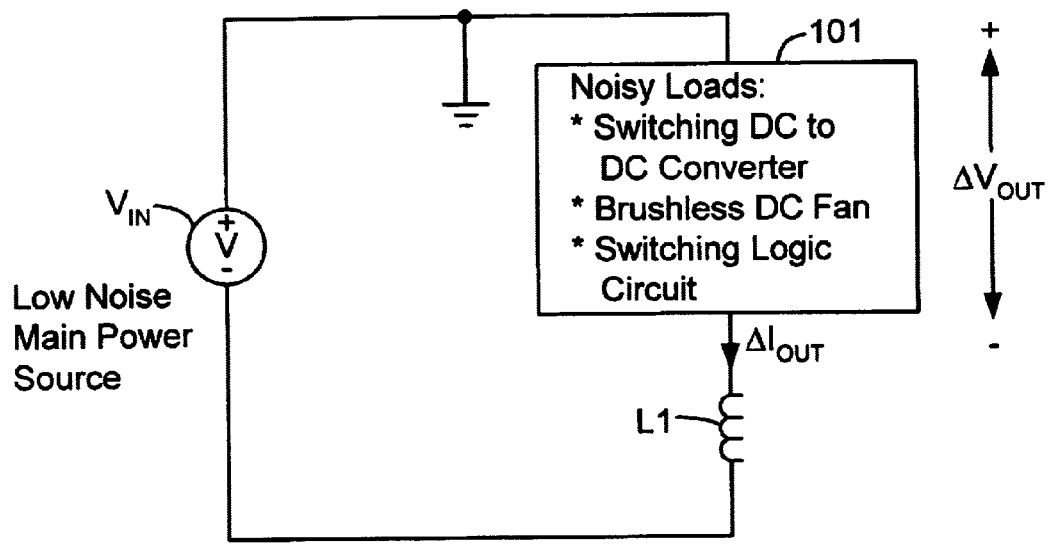
FIG. 1 illustrates a conventional filter for isolating an electrically noisy load from a low noise main power supply source.

To maintain low noise for the main power source, $V_{IN}$, the inductor L1 in FIG. 1 should be sized with a high impedance relative to the impedance, $Z_{LOAD}$, of the noisy load 101, such as $Z_{L1}=\sim1000*Z_{LOAD}$. This will minimize the affects that the noise in FIG. 2 has on the low noise power supply $V_{IN}$. An equivalent resistance, $Z_{LOAD}$, of the noisy load 101 for the given conditions from Equation 1 is shown below.

$$Z_{LOAD}=(1 \text{ VPP})/(1 \text{ Amp})=1 \text{ Ohm}.$$

An expression for the impedance of inductor L1 in FIG. 1 is shown below as Equation 2.

$$Z_{L1}=2\pi*f*L1 \quad \text{(Equation 2)}$$

Since the minimum noise frequency $f_{min}$ is 20 Hz in the example of FIG. 2, and since the desired inductor L1 impedance is 1000 Ohms in this example, rearranging Equation 2 to solve for the inductance L1, the following results.

$$L1=1000 \text{ Ohms}/(2\pi*20 \text{ Hz})=\sim8 \text{ Henrys}$$

A practical inductor L1 having this value of 8 Henries would weigh greater than 10 pounds and would have a significant physical size.

Figure 3:
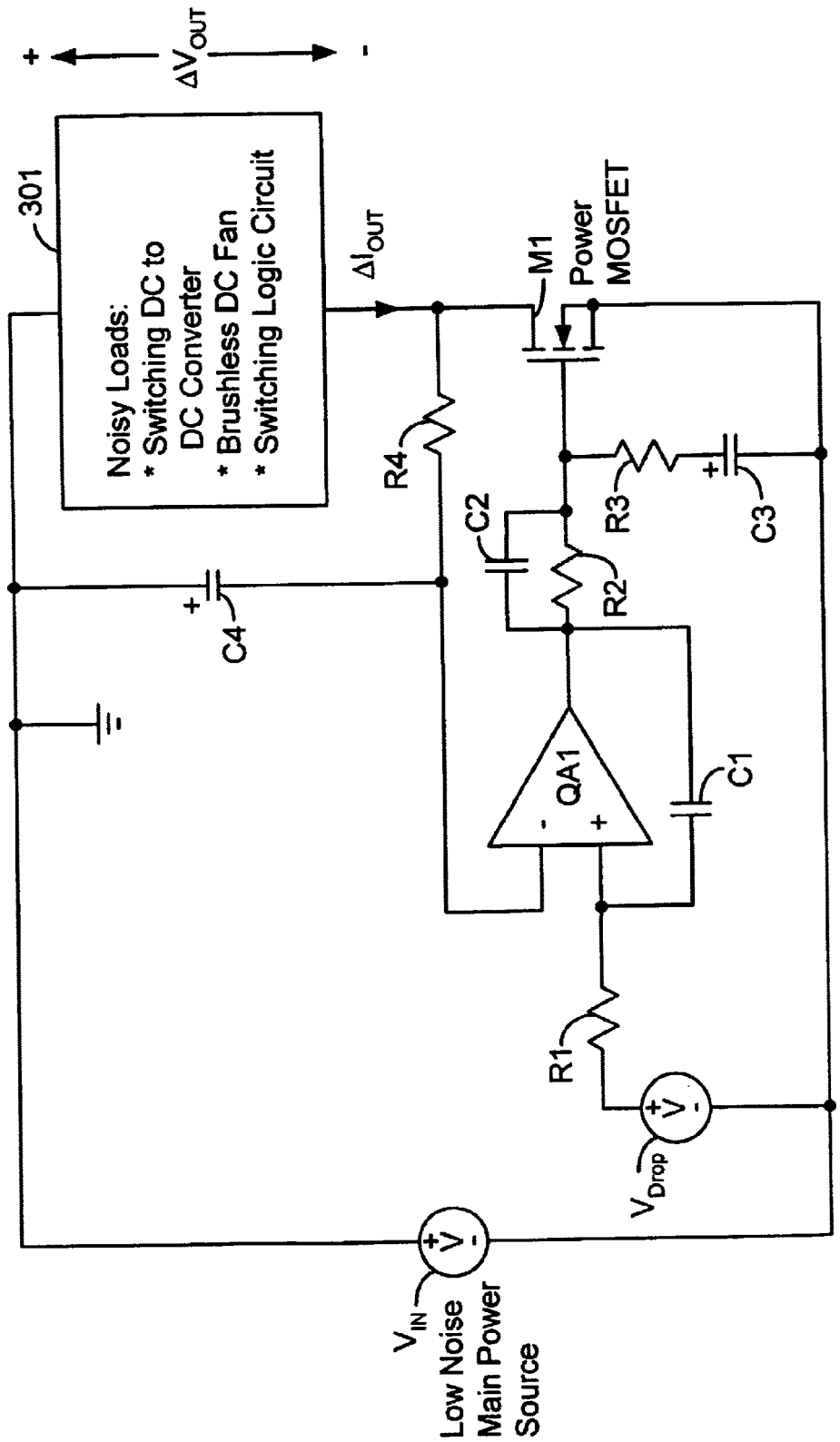
FIG. 3 illustrates an active power filter according to the present invention for isolating an electrically noisy load from a low noise main power supply source.

FIG. 3 illustrates an active power filter according to the present invention for isolating an electrically noisy load 301 from a low noise main power supply source, $V_{IN}$.

The active power filter circuit in FIG. 3 according to the present invention serves the same function as the conventional one in FIG. 1 without the need for an inductor. The components transistor M1, resistor R1, resistor R2, resistor R3, feedback resistor R4, capacitor C1, capacitor C2, capacitor C3, and shunt capacitor C4 with respect to operational amplifier OA1 form an active inductor. The transistor M1 is implemented, for example, by such as an enhancement mode N-channel MOS field effect transistor. The voltage source $V_{DROP}$ serves to provide the necessary headroom for the active circuitry to properly function.

Figure 4:
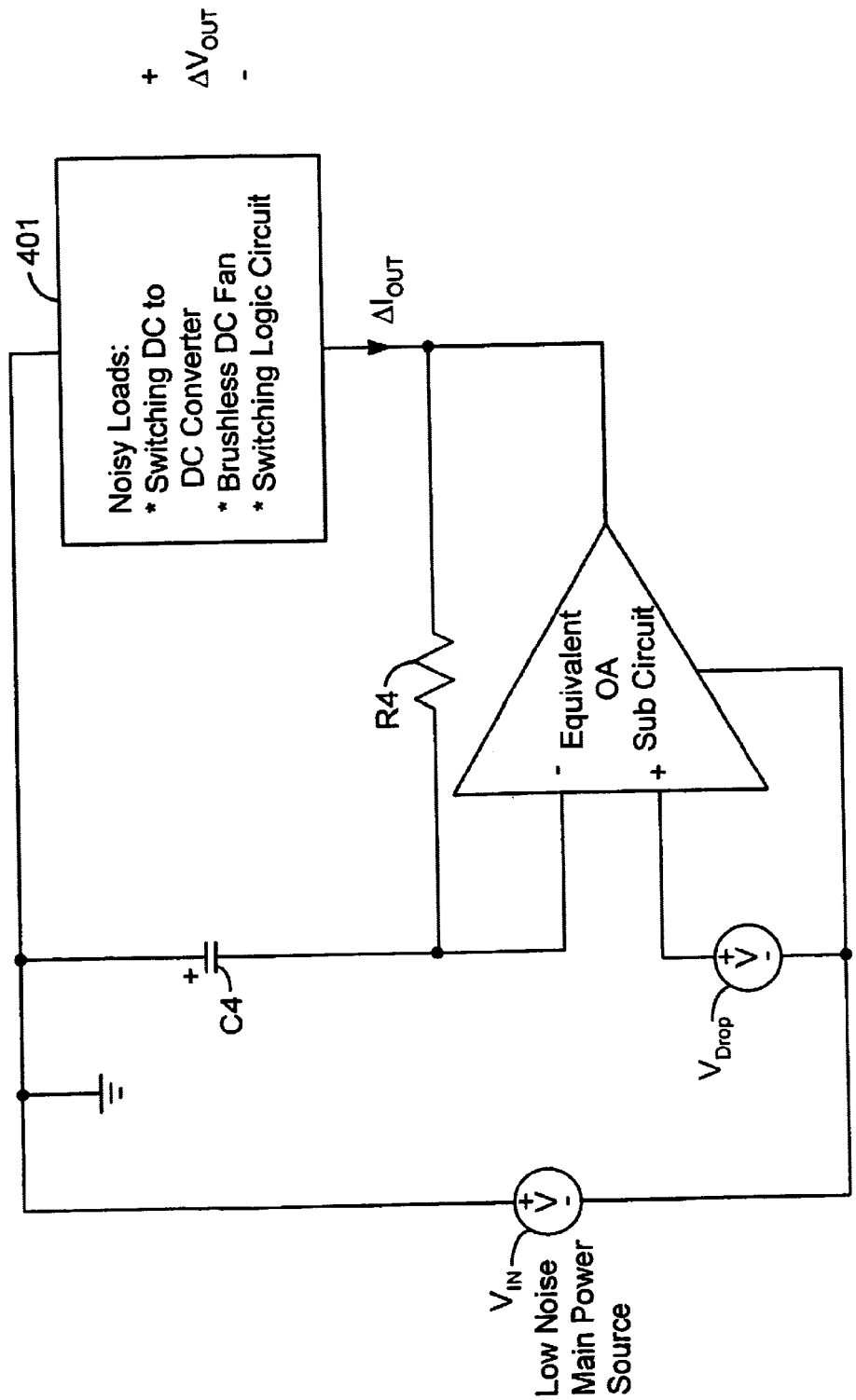
FIG. 4 illustrates a simplified circuit according to the present invention of the active power filter for isolating an electrically noisy load.

FIG. 4 illustrates a simplified circuit according to the present invention of the active power filter for isolating an electrically noisy load. To understand the functioning of the present invention, the components resistor R1, resistor R2, resistor R3, capacitor C1, capacitor C2, capacitor C3, and transistor M1 can be included into a preferred equivalent operational amplifier OA subcircuit that includes negative feedback as shown in FIG. 4, with only shunt capacitor C4 and feedback resistor R4 remaining along with voltage source $V_{DROP}$, and low noise power supply $V_{IN}$, from among the circuit elements shown in FIG. 3. From FIG. 4, a frequency, $f_{V_{OUT}}$ (−3 db) is defined, in which the impedance of shunt capacitor C4 is equal in magnitude to the impedance of feedback resistor R4. At $f_{V_{OUT}}$ (−3 db), ½$\Delta V_{OUT}$ is dropped across feedback resistor R4 and the other ½$\Delta V_{OUT}$ across shunt capacitor C4. In other words, at the frequency $f_{V_{OUT}}$(−3 db), the circuit impedance of the FIG. 4 combination of elements seen by the noisy load 401 is equal to the dynamic load impedance of the noisy load 401 itself.

Consequently, the total impedance at this frequency $f_{V_{OUT}}$ (−3 db) seen by low noise power source $V_{IN}$ is $2*\Delta V_{OUT}/\Delta I_{OUT}$ or 2 times the dynamic load impedance of the noisy load 401. An expression for $f_{V_{OUT}}$(−3 db) is given below as Equation 3.

$$f_{V_{OUT}}(-3 \text{ db})=1/(2\pi R4*C4) \quad \text{(Equation 3)}$$

An expression for the impedance for an inductor is given below as Equation 4.

$$Z_L=2\pi f*L \quad \text{(Equation 4)}$$

Figure 5:
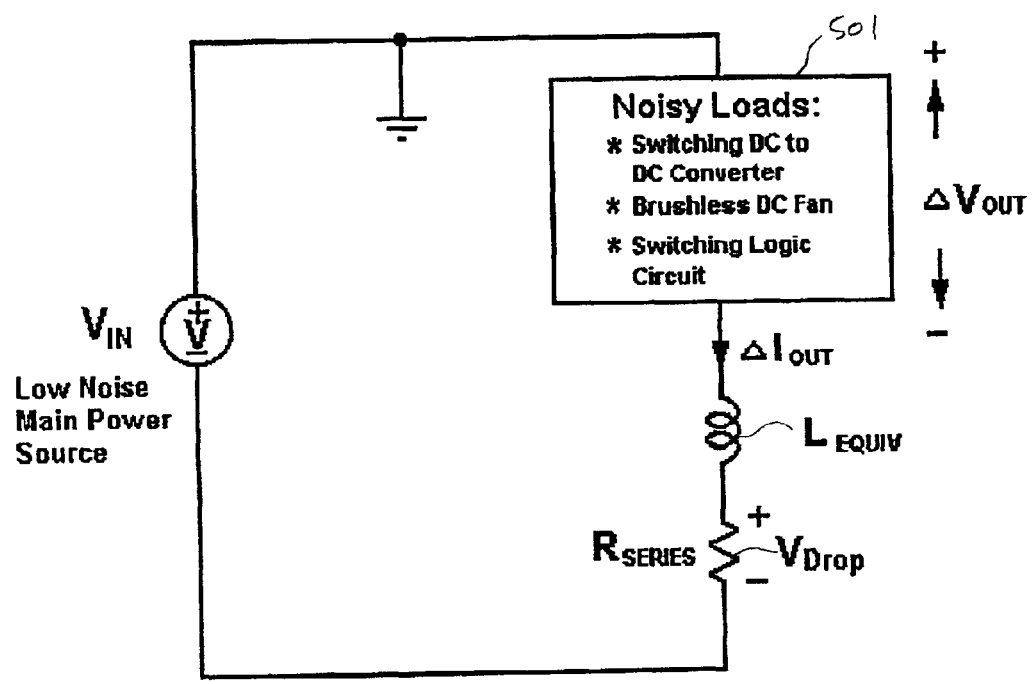
FIG. 5 illustrates an equivalent subcircuit for the active inductor circuit according to the present invention for isolating an electrically noisy load.

FIG. 5 illustrates an equivalent circuit for the active inductor circuit according to the present invention for isolating an electrically noisy load 501. At $f_{V_{OUT}}$(−3 db), and solving Equation 4 for L, an expression for the equivalent inductor, $L_{EQUIV}$ is given below as Equation 5.

$$L_{EQUIV}=Z_{LEQUIV}/\{2\pi*f_{V_{OUT}}(-3 \text{ db})\} \quad \text{(Equation 5)}$$

Using the expression for $f_{V_{OUT}}$(−3 db) from Equation 3, since $Z_{LEQUIV}=Z_{LOAD}$ at this frequency, and using the expression for $Z_{LOAD}$ from Equation 1, Equation 5 simplifies to the following equation 6.

$$L_{EQUIV}=R4*C4*\Delta V_{OUT}/\Delta I_{OUT} \quad \text{(Equation 6)}$$

A circuit showing the use of equivalent inductor $L_{EQUIV}$ is given in FIG. 5. Voltage source $V_{DROP}$ can be set to be $I_{OUTDC}*R_{SERIES}$, where $I_{OUTDC}$ is the average DC operating current of the load and $R_{SERIES}$ is the DC resistance of inductor L1 such as in FIG. 1.

As a comparison, substituting the conventional example requirement of L1 =8 Henrys from FIG. 1 into the active power filter according to the present invention, so that $L_{EQUIV}=8$ Henrys, and $\Delta V_{OUT}=1$ VPP, $\Delta I_{OUT}=1$ Amp R.M.S (root mean square) in FIG. 5, from Equation 6, $$L_{EQUIV}=8 \text{ H}=R4*C4*1V/1 \text{ A}=R4*C4.$$

By selecting R4=1 Megaohm, and solving for C4, C4=8 H/1 Megaohm=8 uF.

While the present invention has been described with reference to its exemplary embodiment, that embodiment is offered by way of example, not by way of limitation. Those of ordinary skill in the art will be enabled by this disclosure to add to or modify the embodiments of the present invention in various ways. For example, the nominal resistances, capacitances, inductances, and load and noise characteristics described above are only exemplary values, and are by no means restrictive. In addition, although the active power filter has been described as protecting a low noise power supply from a noisy load device, it is to be noted that the active power filter according to the present invention is equally capable of protecting a low noise load device from a noisy power supply. Accordingly, those additions and modifications are deemed to lie within the spirit and scope of the present invention, as delineated by the appended claims.

What is claimed is:

1. An active power filter, comprising:

a feedback resistor having first and second terminals;

a shunt capacitor having positive and negative terminals;

an operational amplifier equivalent subcircuit that includes negative feedback and having positive and negative input terminals and having an output terminal; and a voltage drop source having positive and negative terminals;

wherein the positive terminal of the shunt capacitor is coupled to a positive terminal of a noisy load device and to a positive terminal of a low noise direct current power supply;

wherein the negative terminal of the shunt capacitor is coupled to the second terminal of the feedback resistor and to the negative input terminal of the operational amplifier equivalent subcircuit;

wherein the first terminal of the feedback resistor is coupled to the negative terminal of the noisy load device and to the output terminal of the operational amplifier equivalent subcircuit;

wherein the positive terminal of the voltage drop source is coupled to the negative terminal of the operational amplifier equivalent subcircuit;

wherein the negative terminal of the voltage drop source is coupled to a negative terminal of the low noise direct current power supply;

wherein the operational amplifier equivalent subcircuit comprises:

an operational amplifier having positive and negative input terminals and having an output terminal;

a first resistor having first and second terminals;

a second resistor having first and second terminals; and a transistor having a gate, a source, and a drain;

wherein the positive input terminal of the operational amplifier forms the positive input terminal of the operational amplifier equivalent subcircuit;

wherein the drain of the transistor forms the output terminal of the operational amplifier equivalent subcircuit;

wherein the first terminal of the first resistor is coupled to the negative terminal of the operational amplifier;

wherein the second terminal of the first resistor forms the negative terminal of the operational amplifier equivalent subcircuit;

wherein the first terminal of the second resistor is coupled to the gate of the transistor; and wherein the second terminal of the second resistor is coupled to output terminal of the operational amplifier.

2. An active power filter as in claim 1, wherein the source of the transistor is coupled to the negative terminal of the voltage drop source.

3. An active power filter as in claim 1, wherein the operational amplifier equivalent subcircuit further includes:

a first capacitor having first and second terminals;

wherein the first terminal of the first capacitor is coupled to the output terminal of the operational amplifier; and wherein the second terminal of the first capacitor is coupled to the negative input terminal of the operational amplifier.

4. An active power filter as in claim 3, wherein the operational amplifier equivalent subcircuit further includes:

a second capacitor having first and second terminals;

wherein the first terminal of the second capacitor is coupled to the gate of the transistor; and wherein the second terminal of the second capacitor is coupled to the output terminal of the operational amplifier.

5. An active power filter as in claim 4, wherein the operational amplifier equivalent subcircuit further includes:

a third capacitor; and a third resistor;

wherein the third capacitor and the third resistor are connected in series between the gate of the transistor and the negative terminal of the voltage drop source.

6. An active power filter as in claim 1, wherein the transistor comprises an N-channel enhancement mode MOS field effect transistor.

7. An active power filter as in claim 1, wherein the noisy load comprises a switching DC to DC converter.

8. An active power filter as in claim 1, wherein the noisy load comprises a brushless DC fan.

9. An active power filter as in claim 1, wherein the noisy load comprises a switching logic circuit.

10. An active power filter as in claim 1, wherein an impedance of the active power filter is large in comparison to an impedance of the noisy load at a minimum noise frequency generated by the noisy load.

* * * * *